(12) United States Patent
Harvan et al.

(10) Patent No.: US 11,109,231 B2
(45) Date of Patent: Aug. 31, 2021

(54) METHOD AND DEVICE PROVIDING SECURE VENDOR SERVICE ACCESS

(71) Applicant: ABB Technology AG, Zürich (CH)

(72) Inventors: Matus Harvan, Zürich (CH); Roman Schlegel, Wettingen (CH); Sebastian Obermeier, Schinznach-Dorf (CH); Thomas Locher, Zürich (CH)

(73) Assignee: ABB Schweiz AG, Baden (CH)

( * ) Notice: Subject to any disclaimer, the term of this patent is extended or adjusted under 35 U.S.C. 154(b) by 975 days.

(21) Appl. No.: 15/075,577

(22) Filed: Mar. 21, 2016

(65) Prior Publication Data

US 2016/0283702 A1   Sep. 29, 2016

(30) Foreign Application Priority Data

Mar. 23, 2015 (EP) .................................. 15160255

(51) Int. Cl.
| | |
|---|---|
| *G06F 21/62* | (2013.01) |
| *H04W 12/08* | (2021.01) |
| *G06F 21/74* | (2013.01) |
| *G06F 21/35* | (2013.01) |
| *G06F 21/57* | (2013.01) |

(Continued)

(52) U.S. Cl.
CPC ............ *H04W 12/08* (2013.01); *G06F 21/31* (2013.01); *G06F 21/35* (2013.01); *G06F 21/575* (2013.01); *G06F 21/6209* (2013.01); *G06F 21/74* (2013.01); *G06Q 10/20* (2013.01); *G06F 2221/2141* (2013.01);
(Continued)

(58) Field of Classification Search
CPC ...... G06F 21/31; G06F 21/6209; G06F 21/35; G06F 21/575; G06F 21/74; G06F 2221/2151; G06F 2221/2141; G06F 2221/2147; H04W 12/08; H04W 84/12; G06Q 10/20
See application file for complete search history.

(56) References Cited

U.S. PATENT DOCUMENTS

| | | | | | |
|---|---|---|---|---|---|
| 5,844,986 | A | * | 12/1998 | Davis ..................... | G06F 21/572 713/187 |
| 6,161,139 | A | * | 12/2000 | Win ....................... | G06F 21/604 709/223 |

(Continued)

FOREIGN PATENT DOCUMENTS

| | | |
|---|---|---|
| CN | 101790724 A | 7/2010 |
| EP | 2487618 A2 | 8/2012 |
| EP | 2565809 A2 | 3/2013 |

OTHER PUBLICATIONS

European Search Report, EP15160255.4, ABB Technology AG, dated Sep. 1, 2015.

(Continued)

*Primary Examiner* — Joseph P Hirl
*Assistant Examiner* — Stephen T Gundry
(74) *Attorney, Agent, or Firm* — Taft Stettinius & Hollister LLP

(57) ABSTRACT

The present invention provides an approach for granting access and respectively denying access to an instruction set of a device. The technical teaching provides the advantage that unauthorized access can be effectively prevented. Hence, maintenance work can be performed by specialized staff and security sensitive parts of the instruction sets are secured.

9 Claims, 3 Drawing Sheets

(51) Int. Cl.
  *G06F 21/31*  (2013.01)
  *G06Q 10/00*  (2012.01)
  *H04W 84/12*  (2009.01)

(52) U.S. Cl.
  CPC ............... *G06F 2221/2147* (2013.01); *G06F 2221/2151* (2013.01); *H04W 84/12* (2013.01)

(56) References Cited

U.S. PATENT DOCUMENTS

| | | | | |
|---|---|---|---|---|
| 6,167,319 | A * | 12/2000 | Harris | G05B 11/42 |
| | | | | 700/18 |
| 6,438,659 | B1 * | 8/2002 | Bauman | G06F 12/0817 |
| | | | | 711/141 |
| 8,839,447 | B2 * | 9/2014 | Barak | H04L 63/0823 |
| | | | | 726/26 |
| 9,098,714 | B2 * | 8/2015 | Sharp | H04L 63/105 |
| 9,426,147 | B2 * | 8/2016 | Smith | G06F 21/74 |
| 9,594,598 | B1 * | 3/2017 | Brouwer | G06F 9/5077 |
| 9,836,327 | B1 * | 12/2017 | Brouwer | G06F 9/5016 |
| 9,898,528 | B2 * | 2/2018 | Kesin | G06F 17/30675 |
| 9,906,535 | B2 * | 2/2018 | Goldberg | H04L 63/104 |
| 2003/0070099 | A1 * | 4/2003 | Schwartz | G06F 21/31 |
| | | | | 726/5 |
| 2003/0131041 | A1 * | 7/2003 | Dinker | G06F 9/52 |
| | | | | 718/104 |
| 2004/0003288 | A1 * | 1/2004 | Wiseman | G06F 21/57 |
| | | | | 726/30 |
| 2004/0268141 | A1 * | 12/2004 | Zimmer | G06F 21/51 |
| | | | | 726/17 |
| 2006/0184794 | A1 * | 8/2006 | Desselle | G06F 21/575 |
| | | | | 713/166 |
| 2007/0192851 | A1 * | 8/2007 | Onno | G06F 21/35 |
| | | | | 726/20 |
| 2008/0077807 | A1 * | 3/2008 | Hicks | G06F 21/57 |
| | | | | 713/193 |
| 2009/0037749 | A1 | 2/2009 | Jeansome et al. | |
| 2011/0126023 | A1 * | 5/2011 | Wang | G06F 21/6209 |
| | | | | 713/182 |
| 2011/0154023 | A1 * | 6/2011 | Smith | G06F 21/78 |
| | | | | 713/155 |
| 2011/0154481 | A1 * | 6/2011 | Kilgore | G06F 21/31 |
| | | | | 726/19 |
| 2012/0096521 | A1 * | 4/2012 | Peddada | G06F 21/629 |
| | | | | 726/4 |
| 2012/0210113 | A1 * | 8/2012 | Wood | G06F 21/575 |
| | | | | 713/2 |
| 2013/0227699 | A1 * | 8/2013 | Barak | H04L 63/10 |
| | | | | 726/26 |
| 2014/0059656 | A1 * | 2/2014 | Maeda | H04W 12/08 |
| | | | | 726/4 |
| 2014/0143826 | A1 * | 5/2014 | Sharp | H04L 63/105 |
| | | | | 726/1 |
| 2014/0361866 | A1 * | 12/2014 | Evans | H04L 63/102 |
| | | | | 340/4.32 |
| 2014/0366116 | A1 * | 12/2014 | Smith | H04L 63/08 |
| | | | | 726/7 |
| 2015/0082373 | A1 * | 3/2015 | Kottahachchi | H04L 63/102 |
| | | | | 726/1 |
| 2015/0186677 | A1 * | 7/2015 | Sankar | G06F 21/32 |
| | | | | 726/34 |
| 2015/0317168 | A1 * | 11/2015 | Chisholm | G06F 9/441 |
| | | | | 713/2 |
| 2015/0350194 | A1 * | 12/2015 | Gilpin | H04L 63/102 |
| | | | | 726/8 |
| 2015/0356299 | A1 * | 12/2015 | Barkelew | G06F 21/575 |
| | | | | 713/2 |
| 2015/0372994 | A1 * | 12/2015 | Stuntebeck | H04L 63/0281 |
| | | | | 713/156 |
| 2016/0026776 | A1 * | 1/2016 | Hurst | G06F 21/6209 |
| | | | | 713/165 |
| 2016/0087964 | A1 * | 3/2016 | Irving, Jr. | H04W 12/0802 |
| | | | | 726/4 |
| 2016/0204933 | A1 * | 7/2016 | Ronchi | H04W 12/04 |
| | | | | 713/171 |
| 2017/0039352 | A1 * | 2/2017 | Volkening | H04L 9/3247 |
| 2017/0116431 | A1 * | 4/2017 | Lee | G06F 21/74 |
| 2017/0126700 | A1 * | 5/2017 | Hurst | G06Q 10/1093 |
| 2017/0142115 | A1 * | 5/2017 | Chaddha | H04L 63/083 |
| 2017/0149778 | A1 * | 5/2017 | Gill | H04L 63/0876 |
| 2017/0163429 | A1 * | 6/2017 | Stuntebeck | H04W 12/0013 |
| 2017/0177401 | A1 * | 6/2017 | Brouwer | G06F 9/45558 |
| 2017/0213045 | A1 * | 7/2017 | Garcia | H04L 63/04 |
| 2017/0250807 | A1 * | 8/2017 | Brannon | H04L 63/0823 |
| 2017/0293404 | A1 * | 10/2017 | Boodhoo | G06F 3/0482 |
| 2018/0098227 | A1 * | 4/2018 | Carnelli | H04W 4/029 |

OTHER PUBLICATIONS

The Patent Office of the People's Republic of China, First Office Action issued in corresponding Chinese application No. 201610167329.6, dated Mar. 6, 2020, 27 pp.

European Patent Office, Communication Pursuant to Article 94(3) EPC issued in corresponding European application No. 15160255.4, dated Aug. 21, 2017, 5 pp.

The Indian Patent Office, Office Action issued in corresponding Indian application No. 201644009473, dated Jan. 28, 2021, 7 pp.

* cited by examiner

METHOD AND DEVICE PROVIDING SECURE VENDOR SERVICE ACCESS

The present invention relates to a security mechanism that allows a customer to block maintenance access to a specific device. Once the product is delivered to the customer it is the customer's choice to allow access to the configuration files, for instance including the device's firmware, or to restrict the access such that no external service staff is able to access the device configuration. The present invention is furthermore directed towards a respective method for operation of such a device.

The technical background of the present invention is the question whether access to to delivered devices is granted to service staff and how a customer may prevent access to said device such as reading out and changing parameters from a device or updating firmware. Service technicians need access to devices sold by a specific vendor in order to perform maintenance on these devices, adjust device parameters and respond to problems with the devices reported by the customer while the device is on the customer's premises. Restricted access for vendor technicians, i.e., access with more permissions than regular access, is provided by including special access functionality on the device. Access is typically restricted to the vendor's personnel by means of a secret or authentication mechanism, for instance using passwords. Such functionality is known to be a backdoor if the customer cannot disable or remove the access restricted to the vendor's personnel.

There are multiple issues with having a backdoor in place. Firstly, the customer may not accept a backdoor into his devices for security and confidentiality reasons. Therefore it should be possible to deactivate the backdoor. Secondly, as such backdoors typically comprise a secret but non-removable and hard-coded password, they may be in violation of specific cyber security requirements posed by a customer. The problem with hard-coded passwords is that once such a password becomes known, and it is likely that it would, and is published over the Internet, everyone can access the device and the customer cannot change the password nor disable the backdoor to prevent such unauthorized access. As a result a vendor may become the target of an investigation if a customer's device is hacked because of a backdoor and damage is caused. However, there are also types of customers that do not care about such backdoors, e.g., if the device is used in a non-accessible place. For such type of customers, the service access and ease of use is more important than a security feature, thus the customers do not want to bother with passwords or complicated settings.

Known devices provide a feature to generate varying access codes. The generated code is then required by the service technician to access the device. Although the device does not store a secret password in this case, knowledge of the algorithm used and the input to the algorithm, such as initialization values, allows a hacker to deduce the password and in this way obtain unauthorized access. This method is therefore still considered to be a non-removable backdoor, again violating cyber security requirements.

One form of attack on networked computing systems is eavesdropping on network connections to obtain authentication information such as the login IDs and passwords of legitimate users. Once this information is captured, it can be used at a later time to gain access to the system. Many personal computers have an administrative password, which must be entered in order to change system settings or other critical parameters that the user should not normally alter. One-time password systems are designed to counter this type of attack, called a replay attack. Commonly known is a one-time password authentication system, OTP. This system provides authentication for system access (login) and other applications requiring authentication that is secure against passive attacks based on replaying captured reusable passwords.

SecurID is a known mechanism for performing two-factor authentication for a user to a network resource.

Solutions exist to secure access to a device by requiring, in addition to a username and a password, an additional factor. Examples of this additional factor are pre-generated tokens such as TAN-numbers used to authorize transactions in online banking, one-time passwords generated based on current time and used to secure access to online services, one-time passwords generated by RSA fobs, which are used to secure access to online services and VPN tunnels.

Deployment of two-factor authentication remains limited in scope and scale. Despite increasingly higher levels of threats and attacks, most applications still rely on weak authentication schemes for policing user access. The lack of interoperability among hardware and firmware technology vendors has been a limiting factor in the adoption of two-factor authentication technology. In particular, the absence of open specifications has led to solutions where hardware and firmware components are tightly coupled through proprietary technology, resulting in high-cost solutions, poor adoption, and limited innovation.

A drawback of methods according to the state of the art is that they are either posing a lot of effort for securing a device or they may not be secure.

It is therefore an object of the present invention to provide a customer with an improved device that can be easily configured without requiring much effort such that access to the device is restricted. Hence, the user is able to decide for himself whether maintenance staff or technicians are granted access to the device.

This problem is solved by the subject matter according to the independent claim 1.

Accordingly, a device providing secure vendor service access for its maintenance is suggested, comprising a configuration storage providing a device configuration for operating the device and a security module being arranged to assign at least one access right for accessing the configuration storage, wherein the device is only operable if the at least one access right is set.

The invention as currently suggested relates to a device which may be any kind of device that is operated using a firmware. Such a device may need maintenance or the fixing of errors by a specialized technician being provided by the vendor. Hence, the customer needs to decide whether the internal security standards allow that external staff access to the provided device. For supporting the customer's security guidelines the device provides an interface which allows secure vendor service access and therefore allows the customer to restrict or disable access to the device by the vendor. The notion of maintenance refers to any kind of accessing the firmware or instruction sets for operating the device by means of read and write operations. For maintenance work it may be required to read out specific parameters from the device or to upload further instruction sets to the device. Any kind of such an access operation can be limited by the customer. The provision of secure vendor service access is accomplished by means of providing access rights to a configuration storage, the configuration storage holding the instruction set being required for operating the device. This enables the customer to grant access rights to specific functionality being stored in the configuration storage.

It may be of advantage to disable the operation of the device as long as no access rights are set. The setting of access rights is considered to be a basic step in the application scenario of the present invention and therefore the customer should always accomplish the setting of access rights first. It may be useful to initiate the access rights as being not set. Hence, it is up to the customer to grant or deny access rights and therefore actively prohibit the vendor the access the device.

For configuration of access rights a security module may be provided, which is arranged to enable a secure modification of the access rights. This may be accomplished by means of further authentication or encryption techniques. Hence, the security module may comprise further hardware or software components that allow the configuration of access rights. The security module may be operated remotely using a data network a network, which can require further components such as an interface module. In one embodiment of the present invention the technician requires a further device, which is plugged into the device to be maintained for reading out service parameters. Hence, the configuration storage is accessed by an interface module.

According to a further embodiment separate interface modules for accessing the configuration storage and one further interface module for accessing the security module are provided. The person skilled in the art appreciates that the configuration storage as well as the security module can be accessed over a wireless network. According to a further aspect of the present invention the configuration storage as well as the security module may be addressed under usage of a further network, such as the internet. If the device provides respective online functionality maintenance work can be accomplished over the internet, once the access rights are set properly.

The security module may be operated according to a transition model. Such a transition model describes states of the access rights, such as access enabled, access disabled or access rights not set. The person skilled in the art appreciates that if the access rights are not yet set technicians do have access to the configuration storage. Once the customer actively disables access rights the technicians no longer have access to the configuration storage. It may be furthermore of advantage for the customer to grant temporary access, for instance by defining a time span for which access to the configuration storage is granted.

Also being described in the context of a specific device, the scope of the present invention addresses the security module on a stand-alone basis as well. The security module as set forth above may be coupled to any device which is operated according to a specific firmware. The person skilled in the art furthermore appreciates that access rights may be set addressing only parts of the configuration set of a device. Furthermore, a role model may be implemented which allows specific technicians or administrators to access specific functionality of the device.

According to a further aspect of the present invention the device is arranged such that the at least one access right is one of a read access right and a write access right. This provides the advantage that technicians can read out status information and run diagnostic routines and can furthermore update system information such as firmware and fix arising problems by a respective reconfiguration of the device.

According to a further aspect of the present invention the device is arranged such that the device configuration comprises at least one of device parameters, a firmware, device control instructions, an instruction set for operating the device and status information. This provides the advantage that control information on all levels from hardware drivers to control routines can be accessed, which makes it possible for technicians to fix errors regarding the configuration of the device.

According to a further aspect of the present invention the device is arranged such that the at least one access right can be assigned according to at least one of a group of further access parameters, the group comprising a permanent access right, a temporary access right and a period of time for which access is granted. This provides the advantage that the customer has great flexibility regarding the assignment of access rights. Upon request technicians can be provided with temporary access, which expires after a predefined amount of time or only specific points in time are available for maintenance.

According to a further aspect of the present invention the security module comprises an interface module for setting the at least one access right. This provides the advantage that maintenance can be performed remotely, for instance using a wireless interface or a further network, such as the internet. It may be of advantage to provide specialized devices fitting the interface module, which furthermore restrict the access. The interface module may implement further security aspects such that access to the right management is restricted and controlled properly.

According to a further aspect of the present invention the device is arranged to operate the security module under usage of encryption techniques. This provides the advantage that further security mechanism can be applied for controlling the access right management.

According to a further aspect of the present invention the device is arranged such that the at least one access right is configurable such that access to the configuration storage is enabled, disabled or not set. This provides the advantage that initially after the device is delivered to the customer the access rights are not yet set, which provides the customer with full flexibility regarding the setting of the respective access rights. Hence, no default configuration is delivered but the choice of granting access is completely left to the customer.

According to a further aspect of the present invention the device is arranged such that a transition from the condition of access rights not being set to one of the conditions access enabled and access disabled and vice versa is shiftable. This provides the advantage that a clearly defined transition model is implemented, which allows the customer in an easy and hence less error prone way to configure the device without a familiarization phase.

According to a further aspect of the present invention the device is arranged such that a direct transition from the condition of access rights enabled to access rights disabled and vice versa is prohibited. This provides the advantage that the device can be set to an initial configuration but no misuse regarding a direct transition from access restricted to access enabled is possible. Still it is within the scope of the invention to allow a transition from a state indicating that access to the device is disabled to a state where access is granted temporarily. This does not contravene the rule that a direct transition from permanent access to a permanent locking is prohibited.

According to a further aspect of the present invention the device is arranged such that a status of at least one access right is coded by at least one access bit. This provides the advantage that the status information can be coded and stored with little effort and a respective flag can be implemented, which is set to 0 or 1 or to a value indicating that it is not set. It may be the case that additional bits or bit sequences are required for coding the status of the access rights.

The focus of the subject matter of the present invention is how special or restricted access to a device can be implemented in a secure way. As mentioned before, special or restricted access is needed, e.g. for maintenance. The customer may not be allowed to access this functionality for safety, warranty, and sometimes even legal reasons.

The devices targeted by this invention are stand-alone devices that are not tied into a central authentication scheme. Furthermore, technicians access different functionality than the customer and therefore technicians have different access rights than the customer. The devices may not even require customer authentication at all, for example if the customer can only monitor the device but cannot reconfigure it. This poses the need to be able to deactivate the special access functionality but at the same time it should not be feasible for a hacker or intruder to turn it off, even if there is no customer authentication. As a result, a non-standard authentication solution is needed. In summary, a system should be in place that protects access to the service functionality in the sense that only technicians can use it. Moreover, it is possible to deactivate the service functionality. If the customer does not want to give access to technicians, it should not be possible for them to (re-)activate access without the customer's appreciation. Finally, if the customer grants access to technicians, it should not be possible for an intruder to deactivate it.

The present invention provides secure access for service technicians, without non-removable backdoors. The solution meets cyber security requirements and is easy to implement and does not require significant changes to a device. The solution provides benefits for both, security-aware customers and customers who determined low security risks, and thus are more interested in ease of use.

The present invention further provides a method for operating a device providing secure vendor service access for its maintenance, comprising the steps of providing a configuration storage, providing a device configuration for operating the device and providing a security module being arranged to assign at least one access right for accessing the configuration storage, wherein the device is only operable if the at least one access right is set.

In the following the invention will be described merely by way of illustration with reference to the accompanying figures.

FIG. 1 shows a device 1, which is operated according to a method providing secure vendor service access allowing a customer to restrict access rights to the device. The modules and components depicted in the present FIG. 1 are only exemplary and may comprise further devices or be at least connectively coupled to further devices.

Figure 1:
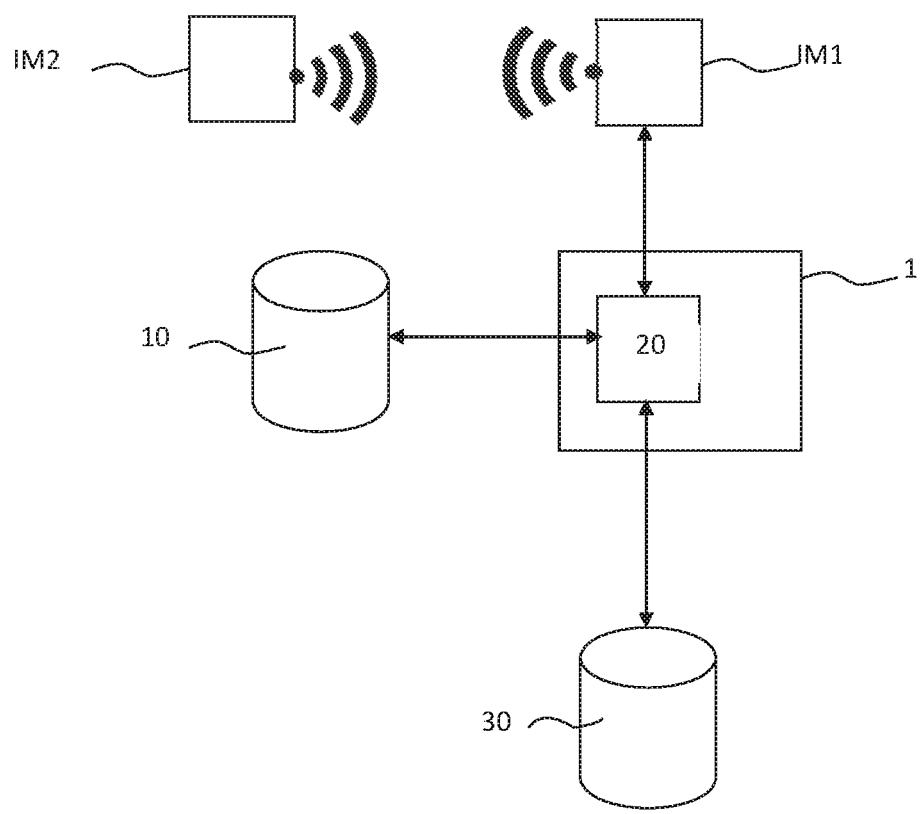
FIG. 1 shows a device providing secure vendor service access for its maintenance according to an aspect of the present invention.

According to the present aspect the device 1 is operated according an instruction set being stored on a configuration storage 10. Typically, such a configuration storage 10 provides firmware and is arranged as an integral part of the device such that the device 1 and the configuration storage 10 are implemented as a single hardware component with the configuration storage 10 being non-removably attached to the device 1. The person skilled in the art appreciates that the configuration storage 10 may also be arranged external to the device 1 and a respective interface is provided for operating the device.

Once a technician needs access to the configuration storage 10 a security module has to be addressed for obtaining access to the configuration storage 10. The security module 20 may be connectively coupled to a further storage device 30, which provides a transition model describing specific access rights and respective control logic for assigning access rights. The access rights database 30 may also store the access rights being already assigned to the configuration storage 10.

According to an application scenario a technician is requested to maintain the device 1. The technician holds a configuration device, which comprises an interface module IM2. For accessing the device the device to be maintained provides an interface module IM1 as well. In the present application scenario the maintenance work is accomplished wirelessly by communication between the two interface modules IM1 and IM2. Hence, the security module 20 is addressed via a wireless interface and the technician requests access rights from the security module 20. Based on an access right configuration being stored in the access right storage 30 the technician is granted access to the configuration storage 10 or access is denied.

In an analogous way the customer is able to set the specific access rights, namely by usage of an interface module IM2, which communicates with the device over a further interface module IM1. Once the customer receives the product, namely the device 1, the customer can actively set the access rights for maintenance work and therefore configure the access rights storage 30. Again, this is performed by addressing the security module 20 and configuring a specific access rights transition model. Such a model is for instance described by FIG. 3 of the present application.

Figure 2:
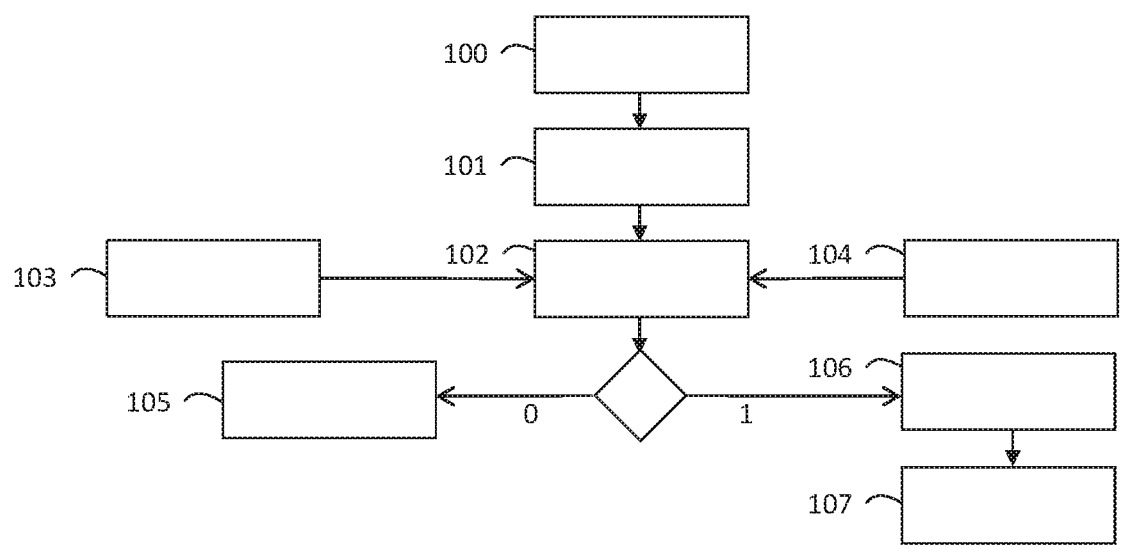
FIG. 2 shows a method for operating a device providing secure vendor service access for its maintenance according to an aspect of the present invention.

FIG. 2 shows a method for operating the device 1 according to a further aspect of the present invention. In the present application scenario the device is operated such that in a first method step 100 an instruction set is provided via a storage, namely the configuration storage 10. This is performed by the manufacturer of the device or the vendor respectively. Along with the instruction set for operating the device undefined access rights are provided in a further step 101. In this method step 101 access rights may be predefined as unset parameters, which means that no values are yet assigned to the access rights. This may also be referred to as an undecided state of the access rights. Hence, it can be defined which read or write access rights are defined for which part of the provided firmware of step 100. The status of access rights can be alternatively tracked in a method step 102. If the access rights are not yet set, which is again determined in a step 102, access may be granted to a technician. It may be of advantage to lock the operation of the device if such access rights are not yet set. This allows a technician to upload new firmware, which then unlocks the device for its normal operation. Hence, if access is requested in method step 103 these respective access rights are checked in a method step 102 and read or write operations may be allowed on the configuration storage or not depending on the outcome of method step 102. Once, the access rights are set in method step 104 and it is determined in method step 102 that access to external technicians is denied, the configuration storage is locked in method step 105. If the outcome of method step 102 is that access is granted the security module may unlock the configuration storage in step 106. Hence, the requested read or write operations can be performed in step 107.

The person skilled in the art appreciates that selected method steps may be performed iteratively and/or in a different order. Further method steps may be required, which are not depicted in the present FIG. 2.

Figure 3:
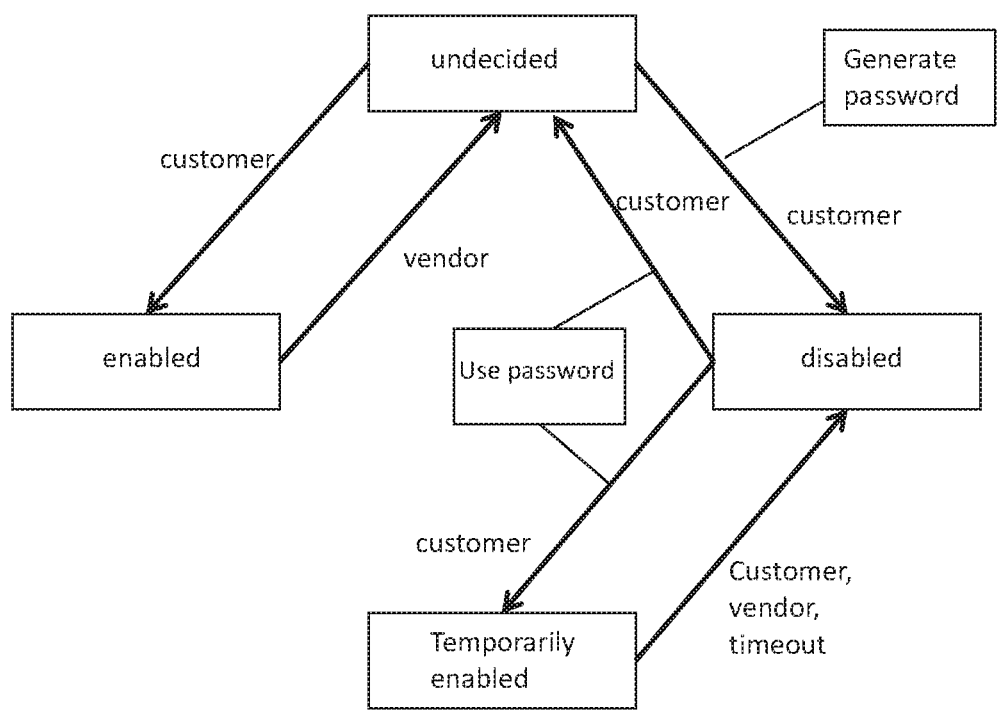
FIG. 3 shows a transition model of a method for operating a device providing secure vendor service access for its maintenance according to an aspect of the present invention.

FIG. 3 shows a transition model of a method for operating a device providing secure vendor service access for its maintenance according to an aspect of the present invention.

After obtaining a device from the vendor, the device is in an "undecided" state. The customer can then explicitly enable or disable the special access functionality, which causes the device to transition into the state "enabled" or "disabled", respectively.

A customer who wants the special service functionality enabled at all times will choose "enabled". In order to avoid the risk of somebody intentionally or unintentionally disabling the service access, the customer cannot disable it on his own once he has enabled it. Each device is equipped with a password-protected account for technicians that can be deactivated by the customer. The password can be used to revert the state from "enabled" back to "undecided", i.e., a technician is required to change this setting if requested.

If a security-aware customer wants to provide access only on-demand or wants to be able to deactivate service access by himself, the right choice is "disabled": When transitioning to the "disabled" state, a random password is generated that the administrator at the customer's site must keep secret. This could be a password printed on the screen. An alternative mechanism is to store the password or certificate directly on an attached USB stick. In this case, access to the USB stick must be protected. Any transition out of the disabled state requires the password, i.e., it is not possible for any person with (physical) access to the machine, including technicians, to re-enable access without the password. This restriction ensures that the vendor cannot use the service as a backdoor. If temporary access is required for maintenance, the administrator at the customer's site enters the password and chooses "temporarily enabled" as the new state. In this state, the device is serviceable as in the "enabled" state; however, the state will transition back to "disabled" when the administrator, the vendor's technician, or a timeout triggers it. Finally, the administrator can also use his password to enter the "undecided" state again, which makes it possible to transition to the "enabled" state. All states and the transitions are depicted in the figure below.

Every state except "disabled" allows technicians to service the device. Note that this may include the state "undecided". This means that a customer that does not touch the device and leaves the entire device management up to the vendor, implicitly allows technicians to access it. The second point is that any action that the customer can carry out without the password can also be performed by anybody else if there are no user accounts with specific access rights configured. All critical transitions, namely from "enabled" to "undecided" and from disabled" to "temporarily enabled" or "undecided" are protected. A misuse is only possible when the device is left in the state "undecided" and an intruder causes a transition to "disabled" and keeps the password to himself. If the customer selects either "enabled" or "disabled" when setting up the device, this risk can be circumvented.

As described above, the present FIG. 3 depicts an exemplary transition module describing specific states of access rights, which are set by the customer. FIG. 3 shows the transitions from the states of being "undecided", "enabled", "disabled" or "temporarily enabled". As can be seen in the present FIG. 3 transitions may only be allowed from "undecided" to "enabled" and vice-versa, from "undecided" to "disabled" and vice-versa. In a specific case transition from "disabled" to "temporarily enabled" and vice-versa are allowed. For prevention of misuse the transition of enabled to disabled and vice-versa is excluded. As can be seen in the right hand side of the present FIG. 3 the customer can disable the access to the device and sets the configuration of the access rights back to "undecided". This excludes the vendor from setting the disabled state back to an "undecided" state. If access rights are to be "enabled" interaction of the customer is required. Hence, a specific role model is implemented which allows secure access to basic functionality of the device. If access is "disabled" it is again only the customer who can temporarily enable the access to the device. Such an access right model may be stored in the respective storage 30 as being depicted in FIG. 1. Hence, a firmware of a device is provided that allows only access to trusted technicians to the instructions set of the device.

The differences between the state of the art and the technical teaching of the present invention are at least that known methods are used to protect and authorize access to a particular service whereas the suggested solution is used to enable or disable the service altogether. The solutions according to the prior art are used in a scenario where the user access does not depend on the authorization of other parties. The suggested solution addresses the scenario where the access by one party has to be authorized by another party, where either party could be the technician or the customer. The suggested solution enables secure access for one party even if there is no authentication mechanism for the other party. The currently provided method protects access to a specific part of the functionality, whereas all other functionality may be available without any authentication.

The person skilled in the art appreciates that the scope of the invention is not limited to role models such as vendor, customer, technician, administrator and the like, but rather addresses generic users may they be human or not. For instance, it may be the case that a machine-based actor, such as a server or generally a computing device, requests access. Hence, all actors as described before may also be any hardware resource, where applicable.

A further aspect of the present invention is a device for providing secure vendor service access for its maintenance, comprising a cache storage with an instruction set and/or a device configuration for operating the device and a security module being arranged to set access rights for accessing the cache storage, wherein the device is locked if no access right is set.

A further aspect of the present invention is a security module for a device for providing secure vendor service access for maintenance of the device, the device comprising a cache storage with an instruction set and/or a device configuration for operating the device, wherein the security module is arranged to set access rights for accessing the cache storage, wherein the device is locked if no access right is set.

Along with the suggested devices, systems and modules respective methods for their operation are provided as well as a computer readable medium having stored thereon instructions executable by a computer processor, the instructions which, when executed by the processor, perform the method of the aspects as set forth above.

The invention claimed is:

1. A method for operating a device providing secure vendor service access for its maintenance, comprising:
   providing a configuration storage providing a device configuration for operating the device; and
   providing a security module being arranged to assign at least one access right for accessing the configuration storage; wherein the device is only operable if the at least one access right is set;
   wherein the device is arranged such that a transition from (1) a condition of access rights not being set, to (2) a condition of access enabled or access disabled, and vice versa, is shiftable; and
   wherein the device is arranged such that a direct transition from (1) the condition of access rights enabled, to (2) access rights disabled, and vice versa, is prohibited, and
   wherein providing secure vendor service access for the maintenance of the device includes providing service functionality for the maintenance of the device.

2. The method according to claim 1, further comprising provision of a transition model specifying enabled transitions of access right states.

3. The method according to claim 1, further comprising unlocking the device if the at least one access right is set.

4. The method according to claim 1, further comprising providing an assignment of access rights to at least a part of the stored device configuration.

5. The method according to claim 1, wherein the device only being operable if the at least one access right is set includes locking the normal operation of the device when the access right is not set.

6. The method according to claim 1, wherein access is granted to a technician when the device is in the condition of access rights not being set.

7. A method for operating a device providing secure vendor service access for its maintenance, comprising:
   providing a configuration storage providing a device configuration for operating the device; and
   providing a security module being arranged to assign at least one access right for accessing the configuration storage; wherein the device is only operable if the at least one access right is set;
   wherein the device is arranged such that a transition from (1) a condition of access rights not being set, to (2) a condition of access enabled or access disabled, and vice versa, is shiftable; and
   wherein the device is arranged such that a direct transition from (1) the condition of access rights enabled, to (2) access rights disabled, and vice versa, is prohibited, and
   wherein a transition from a first state to a second state and a subsequent transition from the second state to the first state results in the device being in an equivalent state to the first state before the transition, wherein
   the first state and the second state include the condition of access rights not being set or the condition of access enabled or access disabled, and wherein
   the first state comprises a different condition to the second state.

8. A method for operating a device providing secure vendor service access for its maintenance, comprising:
   providing a configuration storage providing a device configuration for operating the device; and
   providing a security module being arranged to assign at least one access right for accessing the configuration storage; wherein the device is only operable if the at least one access right is set;
   wherein the device is arranged such that a transition from (1) a condition of access rights not being set, to (2) a condition of access enabled or access disabled, and vice versa, is shiftable; and
   wherein the device is arranged such that a direct transition from (1) the condition of access rights enabled, to (2) access rights disabled, and vice versa, is prohibited, and
   wherein the device is further arranged such that a transition from the condition of access disabled to a condition of access temporarily enabled is shiftable.

9. The method according to claim 8, further comprising providing an assignment of access rights to at least a part of the stored device configuration, wherein
   the method includes generating a password when transitioning from the condition of access rights not being set to the condition of access disabled.

* * * * *